United States Patent
McAdams et al.

(10) Patent No.: US 10,602,716 B2
(45) Date of Patent: Mar. 31, 2020

(54) FEEDING APPARATUS FOR ANIMALS

(71) Applicant: Crystal Spring Colony Farms Ltd., Ste. Agathe (CA)

(72) Inventors: Tom McAdams, Ste. Agathe (CA); Ethan Hofer, Ste. Agathe (CA); Lucien Dnestrianschii, St. Albert (CA)

(73) Assignee: Crystal Spring Colony Farms Ltd., Ste. Agathe, MB (CA)

( * ) Notice: Subject to any disclaimer, the term of this patent is extended or adjusted under 35 U.S.C. 154(b) by 484 days.

(21) Appl. No.: 15/416,104

(22) Filed: Jan. 26, 2017

(65) Prior Publication Data

US 2018/0049403 A1   Feb. 22, 2018

Related U.S. Application Data

(63) Continuation-in-part of application No. 15/239,177, filed on Aug. 17, 2016.

(51) Int. Cl.
   *A01K 5/00*   (2006.01)
   *A01K 5/02*   (2006.01)

(52) U.S. Cl.
   CPC ............ *A01K 5/002* (2013.01); *A01K 5/0225* (2013.01); *A01K 5/0275* (2013.01)

(58) Field of Classification Search
   CPC .. A01K 5/0225; A01K 5/0275; A01K 5/0216; B01F 3/12; B01F 3/18; B01F 5/047; B01F 5/0471; B01F 7/0025; B01F 15/0216; B01F 15/0235; B01F 15/0245; B01F 15/0416; B01F 2215/0008; G05D 11/00

USPC .......................... 119/53, 52.1, 52.3, 53.5, 54
See application file for complete search history.

(56) References Cited

U.S. PATENT DOCUMENTS

| | | | | |
|---|---|---|---|---|
| 1,226,108 | A | * | 5/1917 | Olney ................... B67D 1/0004 222/132 |
| 3,033,164 | A | * | 5/1962 | Evers ..................... A01K 5/025 119/54 |
| 3,820,530 | A | * | 6/1974 | Freeman et al. ... A61B 5/02755 600/526 |
| 3,952,705 | A | * | 4/1976 | Witmer .................. A01K 5/015 119/51.03 |
| 4,185,653 | A | * | 1/1980 | Armstrong ............ B01F 5/0471 137/114 |
| 4,300,554 | A | * | 11/1981 | Hessberg ............ A61M 5/1454 128/DIG. 12 |
| 6,082,300 | A | * | 7/2000 | Futch ....................... A01K 5/02 119/51.11 |

(Continued)

*Primary Examiner* — Tien Q Dinh
*Assistant Examiner* — Ebony E Evans
(74) *Attorney, Agent, or Firm* — Adrian D. Battison; Ade & Company Inc.; Kyle R. Satterthwaite

(57) ABSTRACT

An animal feeding apparatus includes a duct through which feed falls under gravity. A drive wheel is mounted in the duct and includes a plurality of paddle blades such that falling feed in the duct acts to drive the blades to rotate the wheel about the axis. A syringe is laid in a support channel where a plunger of the syringe is compressed longitudinally for feeding a liquid to an injection nozzle into the duct by a screw driven by the wheel. The wheel and the support channel are mounted on a common housing forming the duct and containing the wheel, to an injection opening on the bottom of the housing for addition to the feed passing through the duct portion.

15 Claims, 15 Drawing Sheets

(56) References Cited

U.S. PATENT DOCUMENTS

2012/0048201 A1* 3/2012 Qian .................... A01K 5/0114
                                                    119/57.92

* cited by examiner

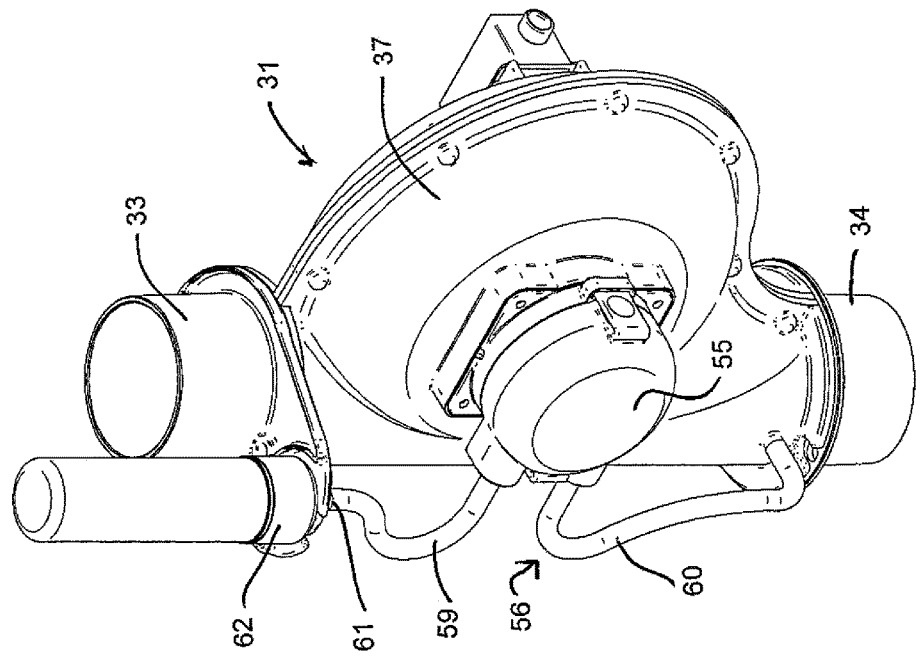
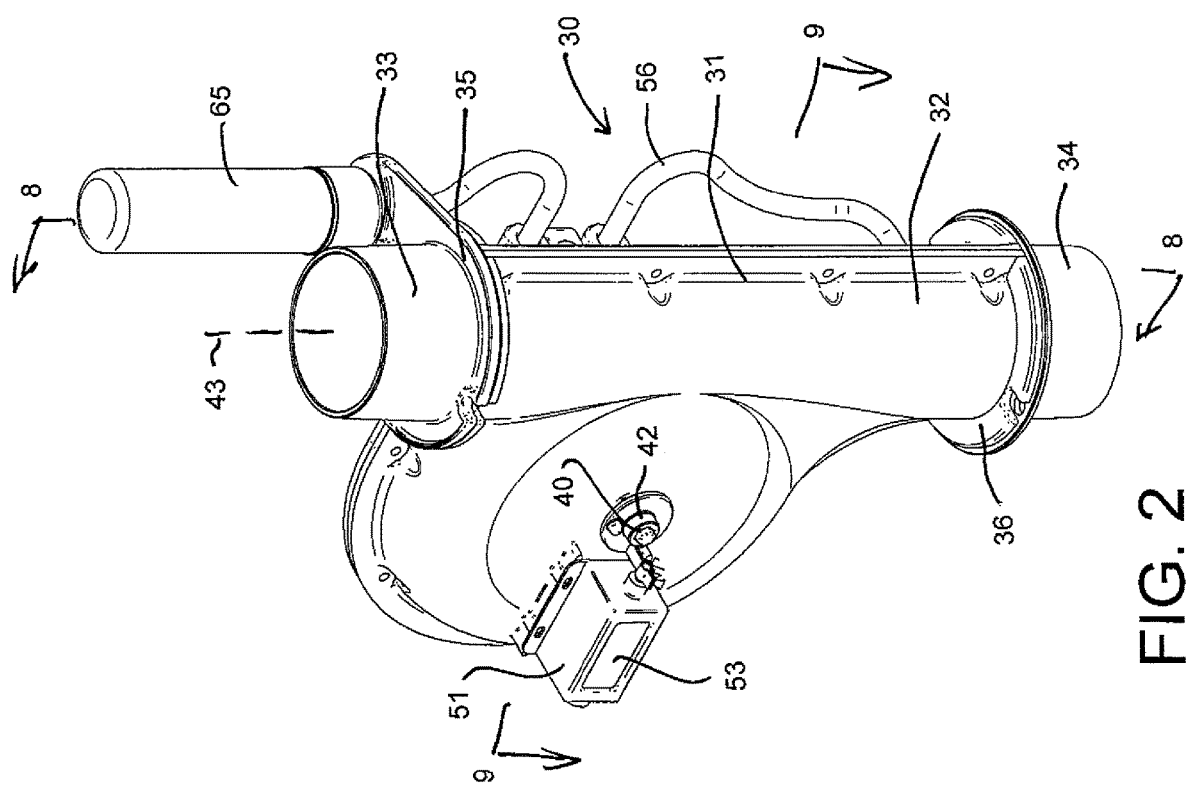

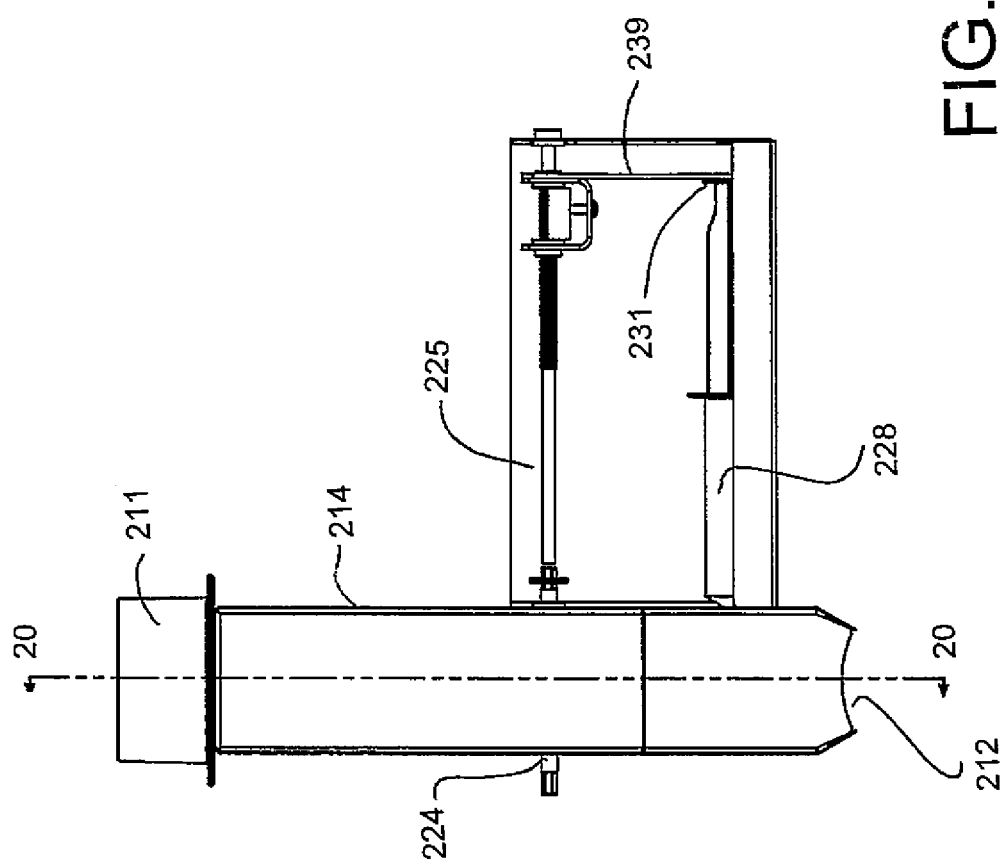

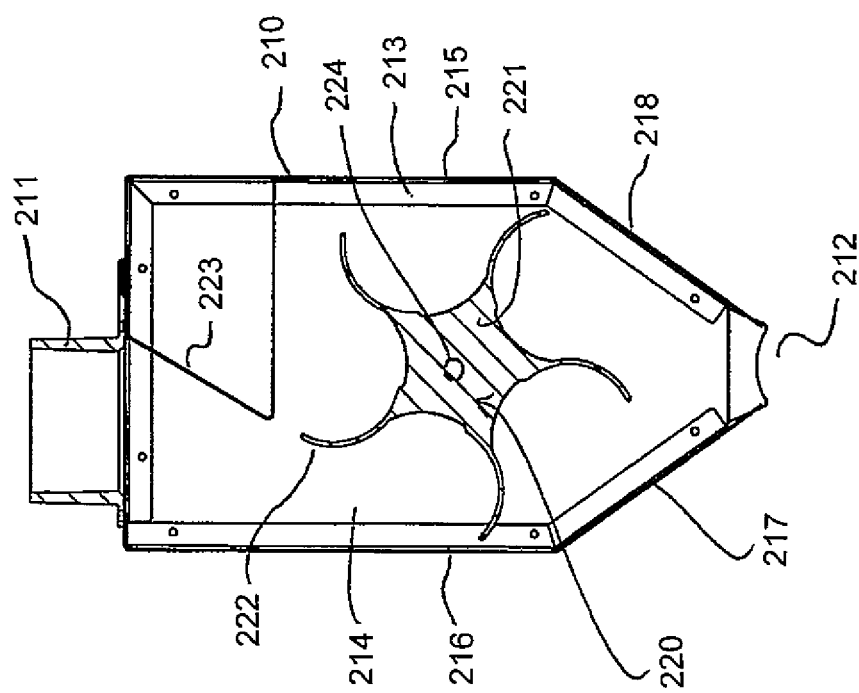

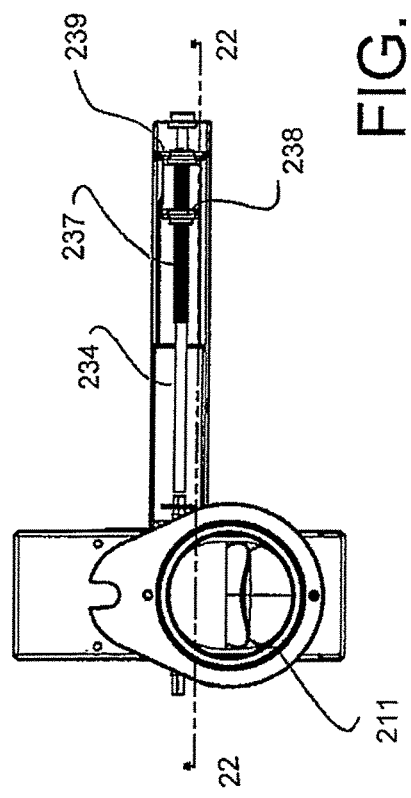
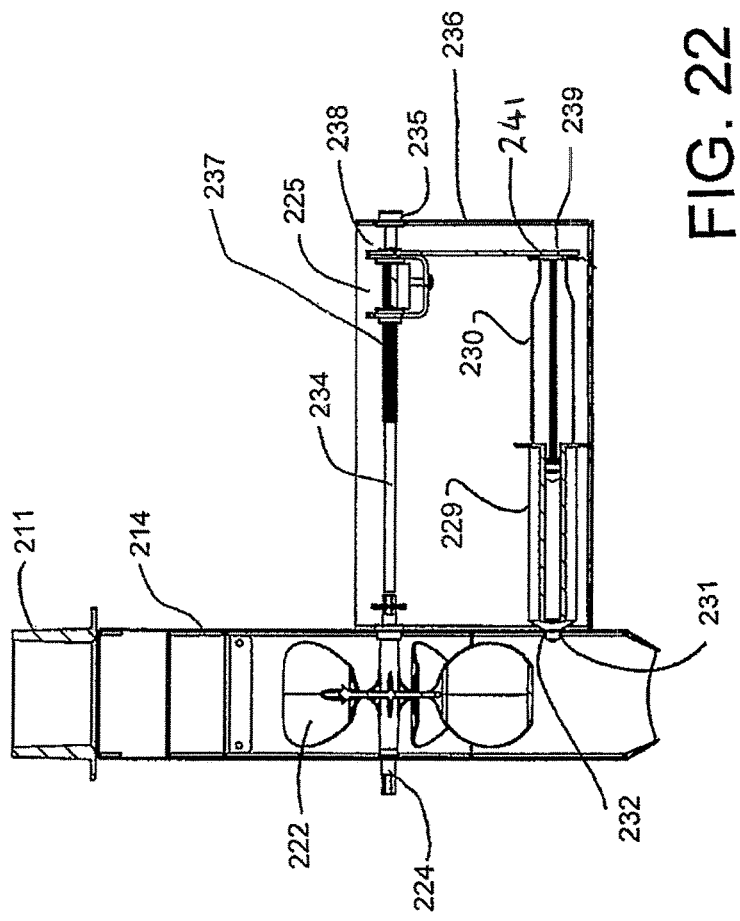

FEEDING APPARATUS FOR ANIMALS

This application is a continuation in part of application Ser. No. 15/239,177 filed Aug. 17 2016 and currently pending.

This invention relates to a feeding apparatus for animals in which feed material deposited through a duct under gravity acts to drive a feed activated engine that can be used to drive other mechanisms such as feed flow counters, solid or liquid dispensers, mixers and others.

The term "animal" as used herein is intended to include any farmed livestock including birds, fish, where there is provided at least one feeder with a feed duct through which the material is supplied.

BACKGROUND OF THE INVENTION

It is well known that feeding systems for animals particularly those contained within a barn include a series of feeders located at suitable positions within the barn is for receiving feed from a supply system ducting the feed to the individual feeders.

In some cases the animals may simply need a feed product which is the same product apply to each of the feeders. In other cases the animals may need a supplement or additive either for a limited period of time or for some only of the animals depending upon their condition.

The addition of supplements to the feed has raised some difficulties a temporary period of supply and for supply to selected ones of the animals.

SUMMARY OF THE INVENTION

It is an object of the present invention to provide a feeding system for animals which allows the ready addition of an additive material into the feed material to be supplied to a feed dispensing system to be taken by the animal.

According to one aspect of the invention there is provided an apparatus for feeding animals comprising:

a feed supply duct through which feed passes;

a drive member mounted at the duct and arranged to be driven in response to feed passing at a rate proportional to the passing of the feed;

a receptacle for receiving a removable container for an additive material for supply to supply opening for addition to the feed passing through the duct;

and a driven component driven by the drive member arranged to forward the additive material from the container while received in the receptacle to the supply opening at a rate proportional to the rate of the drive member.

Preferably the driven component comprises a dispenser for feeding an additive material from a supply to an injection opening for addition to the feed passing through the duct.

In one arrangement the dispenser is a liquid pump and the additive material is a liquid.

In another arrangement the dispenser is a particulate feed wheel arranged to meter a particulate material.

Preferably the drive member and the driven member are mounted in a common housing and the injection opening is located on the housing.

According to a further aspect of the invention there is provided an apparatus for feeding animals comprising:

a feed supply duct through which feed passes;

a drive member mounted at the duct and arranged to be driven in rotation around an axis in response to feed passing at a rate proportional to the passing of the feed;

a container for an additive material for supply to an injection opening for addition to the feed passing through the duct and a driven component driven by the rotation of the drive member arranged to apply a pressure to the container to expel the additive material to the injection opening.

Preferably the container sits in a receptacle and the driven member is actuated to apply pressure to the container in the receptacle longitudinally of the receptacle to expel the additive material therefrom. In particular, preferably the receptacle forms a tray in which the container lies and the driven member is a compression member movable in a direction longitudinally of the container.

Preferably the container is a syringe and the compression member comprises a plunger movable longitudinally into the syringe. In this arrangement preferably the compression member is driven linearly to compress the plunger of the syringe by rotation of the drive member. In one arrangement the compression member is driven by a screw, but of the drive arrangements can be used which convert the rotational movement of the wheel to linear compression movement of the plunger.

Thus in the preferred arrangement the driven component acts to reduce the volume of the container. While the syringe is the preferred container since it is readily available and can be supplied with the required quantity of liquid, other types of containers can be used where the movement of the wheel acts to compress the container. For example in some arrangements the container can be squeezed between two abutting members of such as rollers where rotation of the rollers is caused by the rotation of the wheel.

In the preferred arrangement the container has a supply opening at one end for locating against the duct and the driven component acts to compress the container toward the one end. In this arrangement the supply opening preferably comprises an injection nozzle at the one end. Thus the injection nozzle is placed against a face of the duct and passes through an opening in the duct to expel the liquid into the material within the duct.

Preferably the apparatus includes a housing within which the drive member or paddle wheel is mounted and the housing forms the duct with couplings at top and bottom of the housing to connect to supply duct portions in a supply line from a source of the feed to the animal feed or other dispensing container.

Preferably the drive member comprises a paddle wheel where each of the paddle blades extends across the duct from an inner edge on one side of the duct to an outer edge at the duct where the outer edge has an outer peripheral shape in a view longitudinal of the duct which closely matches an inside surface of the duct and where each of the paddle blades has a shape is side elevational view at right angles to the duct which is curved outwardly of an axis of the wheel and in a rearward direction relative to movement of the feed through the duct. However other arrangements for generating a rotational movement in response to the passage of the feed material through the duct can be provided.

Preferably the syringe is supported in a channel member where an outer surface of the syringe is carried in the channel. With the syringe suitably supported a plunger of the syringe is driven longitudinally of the syringe by an abutment member moved longitudinally of the syringe and along the channel driven by rotation of the drive member.

According to a further important feature of the invention there is provided an apparatus for feeding animals comprising:

a feed supply duct for feeding at least one feed dispensing container at which at least one animal can take feed;

the feed supply duct being arranged such that the feed falls through the feed supply duct under gravity;

a drive member mounted at the duct and including a plurality of paddle blades of a wheel mounted for rotation about an axis of the wheel such that falling feed in the duct acts to drive the blades to rotate the wheel about the axis;

and a driven component driven by the wheel.

According to a yet further important feature of the invention there is provided an apparatus comprising:

a housing defining a duct passing therethrough;

couplings at a top and a bottom of the housing each arranged to connect to an end of a respective duct portion of a feed supply line;

a drive member mounted at the duct and including a plurality of paddle blades of a wheel mounted for rotation about an axis of the wheel such that falling feed in the duct acts to drive the blades to rotate the wheel about the axis;

and a driven component mounted on the housing driven by the wheel.

In accordance with a particularly preferred arrangement of the present invention there is provided a housing within which the wheel is mounted and the housing forms the duct with couplings at top and bottom of the housing to connect to supply duct portions in a supply line from a source of the feed to the dispensing container.

Preferably each of the paddle blades extends across the duct from an inner edge on one side of the duct to an outer edge at the duct where the outer edge has an outer peripheral shape in a view longitudinal of the duct which closely matches an inside surface of the duct and where each of the paddle blades has a shape is side elevational view at right angles to the duct which is curved outwardly of an axis of the wheel and in a rearward direction relative to movement of the feed through the duct. These two curvatures provide a complex shape of the blade bearing in mind that the rearward curvature is taken into account in the peripheral shape so that the peripheral shape passes through the duct in close proximity to the duct wall to prevent the feed material from flowing past the blade through the duct. In this way the blade in effect meters the material forwardly so that a certain volume of feed falling downwardly in the duct acts to drive the wheel through a certain angle of rotation.

Preferably the axis of the wheel is offset to one side of duct and is generally at right angles to the duct with the blades extending across the duct. In this way the duct portion defined in the structure itself can have the same dimensions as the duct portions above and below the structure.

In one embodiment the driven component comprises a simply counter which provides an output indicative of a number of turns of the wheel which is proportional to an amount of feed passing through the duct. In addition the counter can be used in combination with other driven components. The counter thus can be used to provide an indication of a volume of feed supplied to the particular feed distribution container or feeder. The counter can also be used to indicate that the system is blocked or for some reason the wheel is not being driven.

In a particularly important aspect the driven component preferably comprises a dispenser for feeding an additive material from a supply to an injection opening for addition to the feed passing through the duct. In this way the driven component can meter the additive material into the feed at a proscribed rate.

In one arrangement the dispenser is a liquid pump such as a peristaltic pump and the additive material is a liquid.

In another arrangement the dispenser is a particulate feed wheel arranged to meter a particulate material.

Whether the additive material is a liquid or a particulate, the additive material can be located in a replaceable supply cartridge which can be inserted into a receptacle on the housing of the device to supply the material to the metering system.

In this arrangement preferably the wheel and the dispenser are mounted in a common housing and both the receptacle for the cartridge of supply and the injection opening are located on the housing.

In order for the structure to provide a simple arrangement with few mechanical parts, preferably the additive material is shut off by simply removing the supply cartridge from the mounting. In addition preferably the rate of supply of the metered material is constant relative to the rates of rotation of the wheel so as to avoid adjustment systems. Typically a constant proportion of the additive material relative to the feed is an acceptable direction.

Preferably the supply cartridge includes a nozzle for dispensing liquid and the mounting or receptacle for the cartridge includes a cylindrical collar for receiving a cylindrical lower end of the cartridge and a tube into which the nozzle which extends axially from one end of the cartridge is inserted.

Preferably the collar is mounted on a bracket attached to an upper connector arranged for connection of the duct to a feed duct portion. In this way the collar is presented upwardly at the top of the housing to allow the cartridge to be inserted downwardly with the nozzle projecting into the tube.

In the arrangement for dispensing a particulate additive, preferably the mounting comprises a flared upwardly facing mouth into which a lower end of a cylindrical cartridge for the particulate material is inserted. The flared mouth is molded into a housing containing the wheel and the duct and communicates with the metering wheel between the flared mouth and the duct.

In accordance with another aspect of the invention, the apparatus as defined above can be used in conjunction with an apparatus for feeding animals comprising a feed dispensing container at which at least one animal can take feed, a supply source for supplying feed to said dispensing container and a supply line from a source of the feed to the dispensing container including separate duct portions.

The main difference we see in the arrangement as described herein is that the "feed activated engine" or wheel is driven using only feed gravity and it is not controlled or triggered by the mechanics or electronics of the feed conveying system.

The concept as described herein relates therefore to the provision of a feed activated engine that can be used to drive other mechanisms like feed flow counters, solid or liquid dispensers, mixers etc.

The main objective is to provide a simple mechanical system that does not depend on any electrical or electronic controls.

BRIEF DESCRIPTION OF THE DRAWINGS

One embodiment of the invention will now be described in conjunction with the accompanying drawings in which:

FIG. 2 is a first isometric view of the additive metering system of FIG. 1.

FIG. 3 is a second isometric view of the additive metering system of FIG. 1.

FIG. 19 is a side elevational view of the embodiment of FIG. 18.

FIG. 20 is a cross-sectional view along the lines 20-20 of FIG. 19.

FIG. 21 is a top plan view of the embodiment of FIG. 18.

FIG. 22 is a cross-sectional view along the lines of 22-22 of FIG. 21.

In the drawings like characters of reference indicate corresponding parts in the different figures.

DETAILED DESCRIPTION

Figure 1:
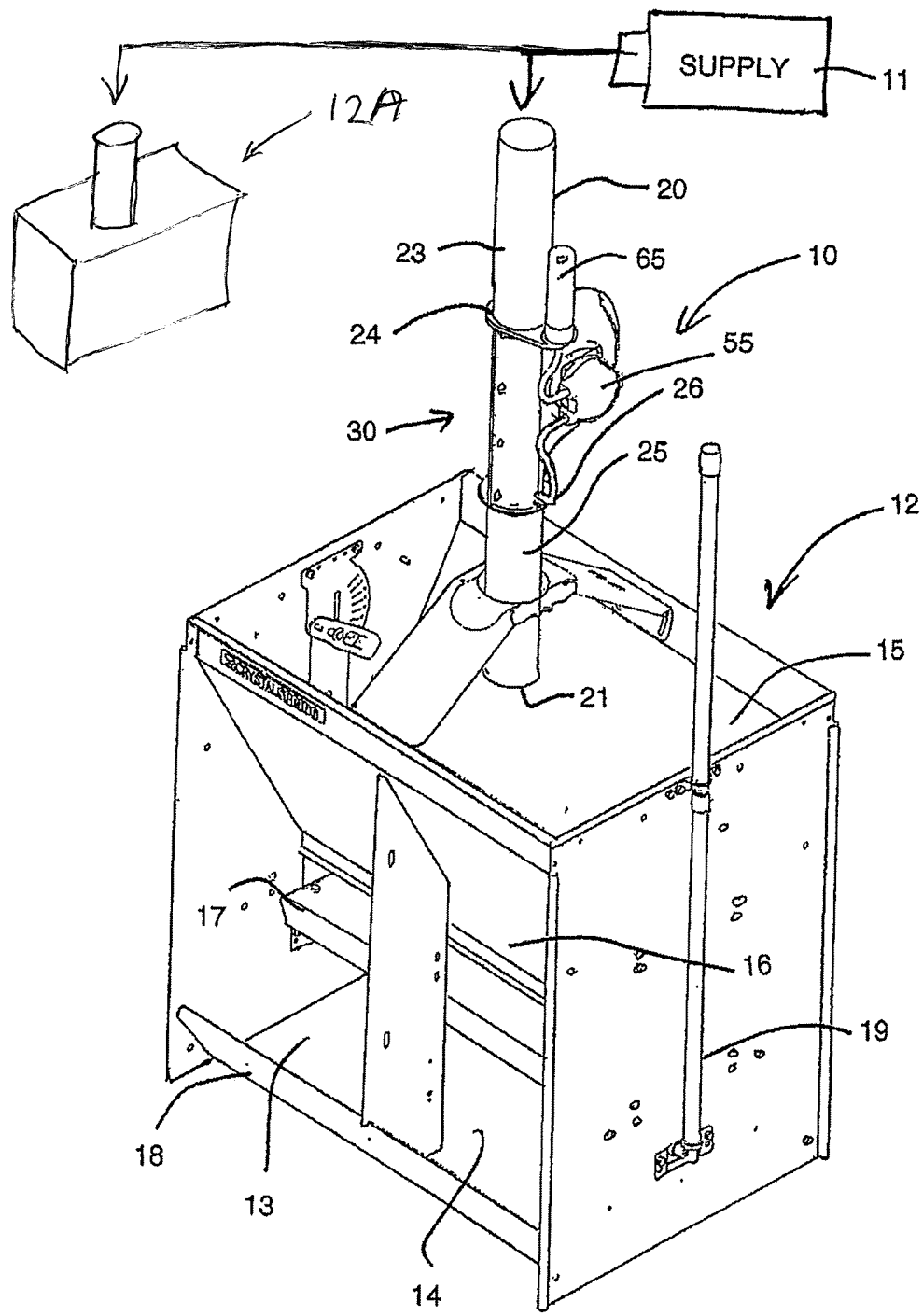
FIG. 1 is an isometric view of a feeder of a feeding apparatus including an additive metering system according to the present invention.
Figure 4:
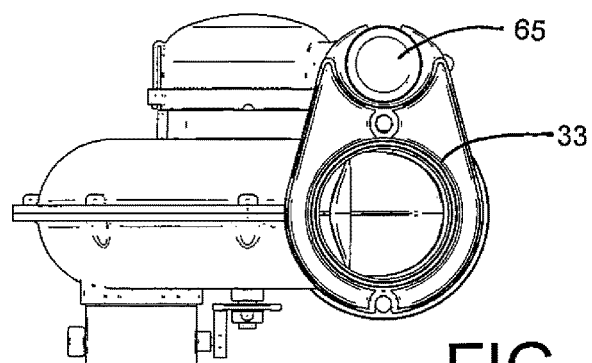
FIG. 4 is a top plan view of the additive metering system of FIG. 1.
Figure 5:
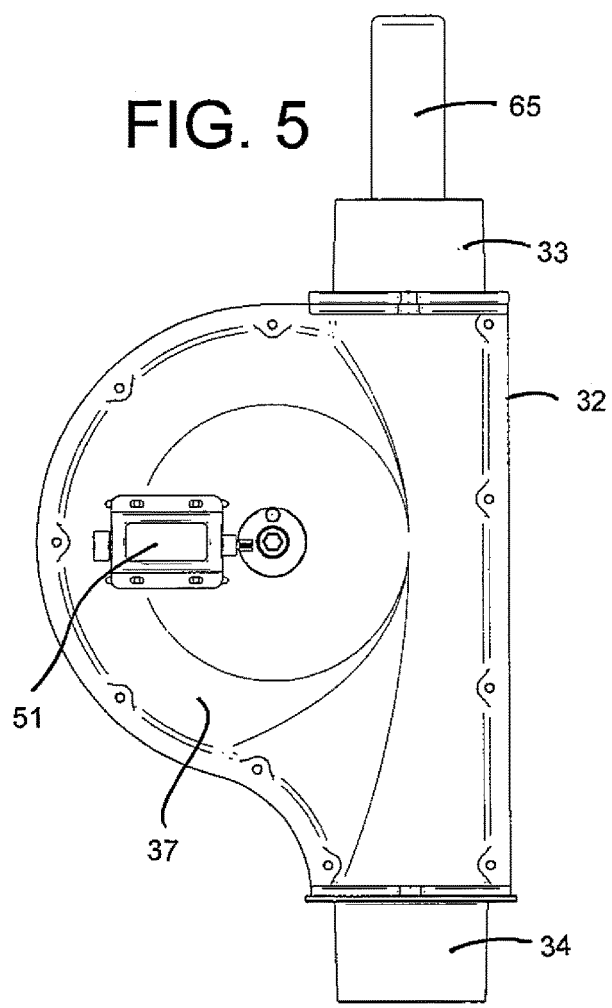
FIG. 5 is a side elevational view of the additive metering system of FIG. 1.
Figure 6:
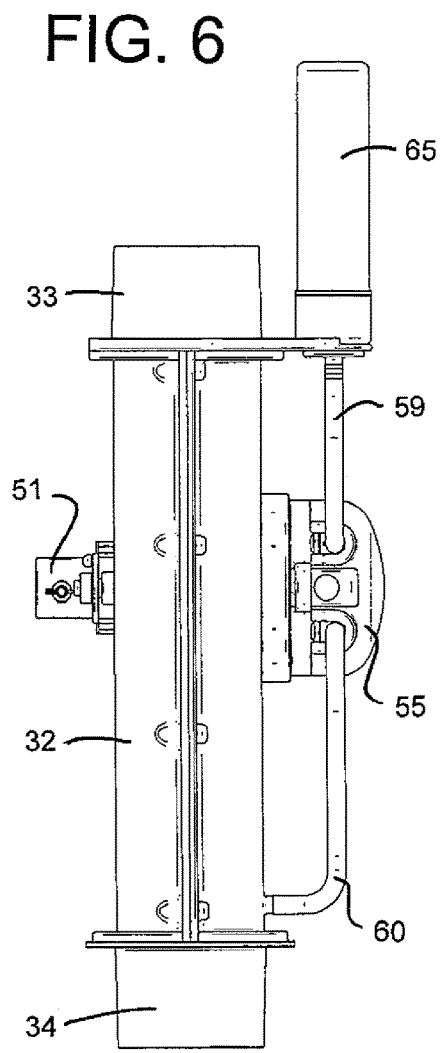
FIG. 6 is a front elevational view of the additive metering system of FIG. 1.

An apparatus 10 for feeding animals includes a supply 11 of feed material force applied to a series of individual feeders or feed dispensing systems generally indicated at 12 and 12A where the feed can be taken by one or more animals at the dispensing systems 12, 12A where the latter is shown only schematically.

In the example shown the feeder 12 is a double sided feeder with two compartments 13, 14 on each side allowing access to the feeder by four animals and simultaneously. In this example the feeder includes a hopper 15 which converges inwardly and downwardly to a bottom opening 16 where the opening discharges onto a shelf 17 located above a bottom trough 18. A water supply 19 is arranged to dispense water into the trough so that feed falling from the shelf is caught in the trough and mixed with water from the supply 19. Feeders of this type are well-known and comprise only one example of the type of feeder which can be used.

Feed from the supply 11 passes through a vertical duct 20 so that the feed falls downwardly through the vertical duct 20 and an open mouth 21 at the bottom of the duct to allow the feed to enter the hopper 15. In some cases feed is supplied continually so that the hopper is maintained full with the position of the mouth 21 preventing overfeeding. In other cases the supply 11 includes a drive 22 which operates periodically the supply required volume of the feed into the hopper 15.

The vertical duct 20 includes an upper portion 23 with a bottom end 24 and the lower portion 25 with upper end 26. Between these two portions is provided a device 30 which includes the components to meter an additive into the feed material in the duct 20 depending upon the rate of movement of the feed within the duct.

The device 30 comprises a common housing 31 which defines a duct portion 32 terminating at an upper end with a collar 33 and at a lower end with a collar 34. A flange 35 on the bottom of the collar 33 is arranged for attachment to a similar flange at the bottom of the duct portion 23. Symmetrically a flange 36 at the top of the collar 34 is arranged for attachment to the duct portion 25. In this way the duct portion 32 defined by the housing is basically at the same cross-sectional shape on the area as the duct portions of 23 and 25 so that the material can flow smoothly through the duct intruding through the duct portion 31 of the housing 30. In this arrangement the ducts are cylindrical as is typical with ducts of this arrangement.

Figure 7:
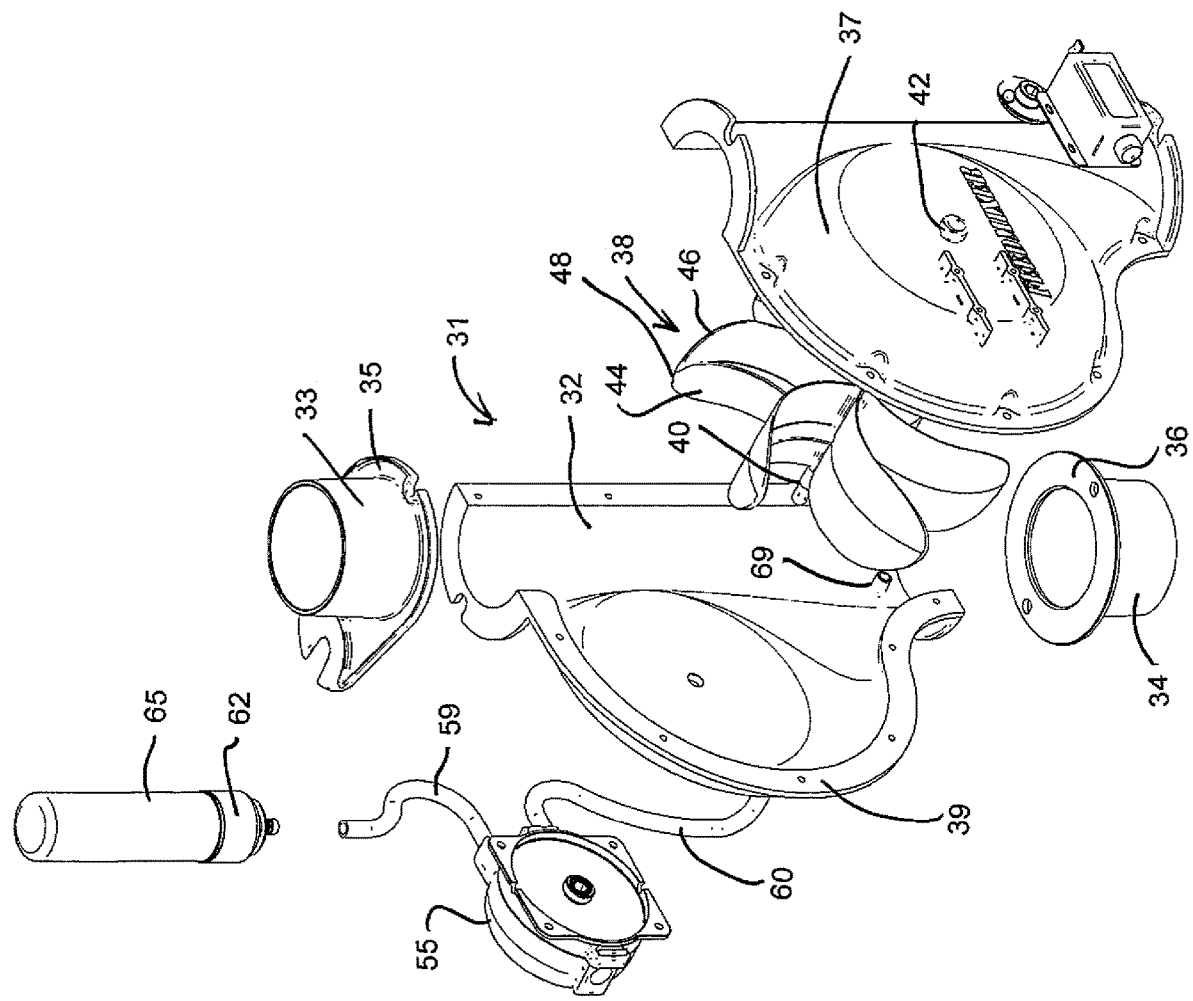
FIG. 7 is an exploded view of the additive metering system of FIG. 1.

The housing 31 further includes an enclosure 37 for a. As shown in FIG. 7 the housing 31 including the duct portion 32 and of the enclosure 37 is formed in two symmetrical opposing sections clamped together at a peripheral flange 39 to enclose the duct and the paddle wheel 38. The flanges 35 and 36 are clamped onto top and bottom portions of the peripheral flange 39 to form the housing structure for attachment to the feed duct to the feeder.

The paddle wheel 38 comprises an axle 40 carrying bushings 41 and 42 on respective sides of the enclosure 37. The axle 40 is offset to one side of the duct portion 32 and is arranged at right angles to a longitudinal axis 43 of the duct 32.

Figure 8:
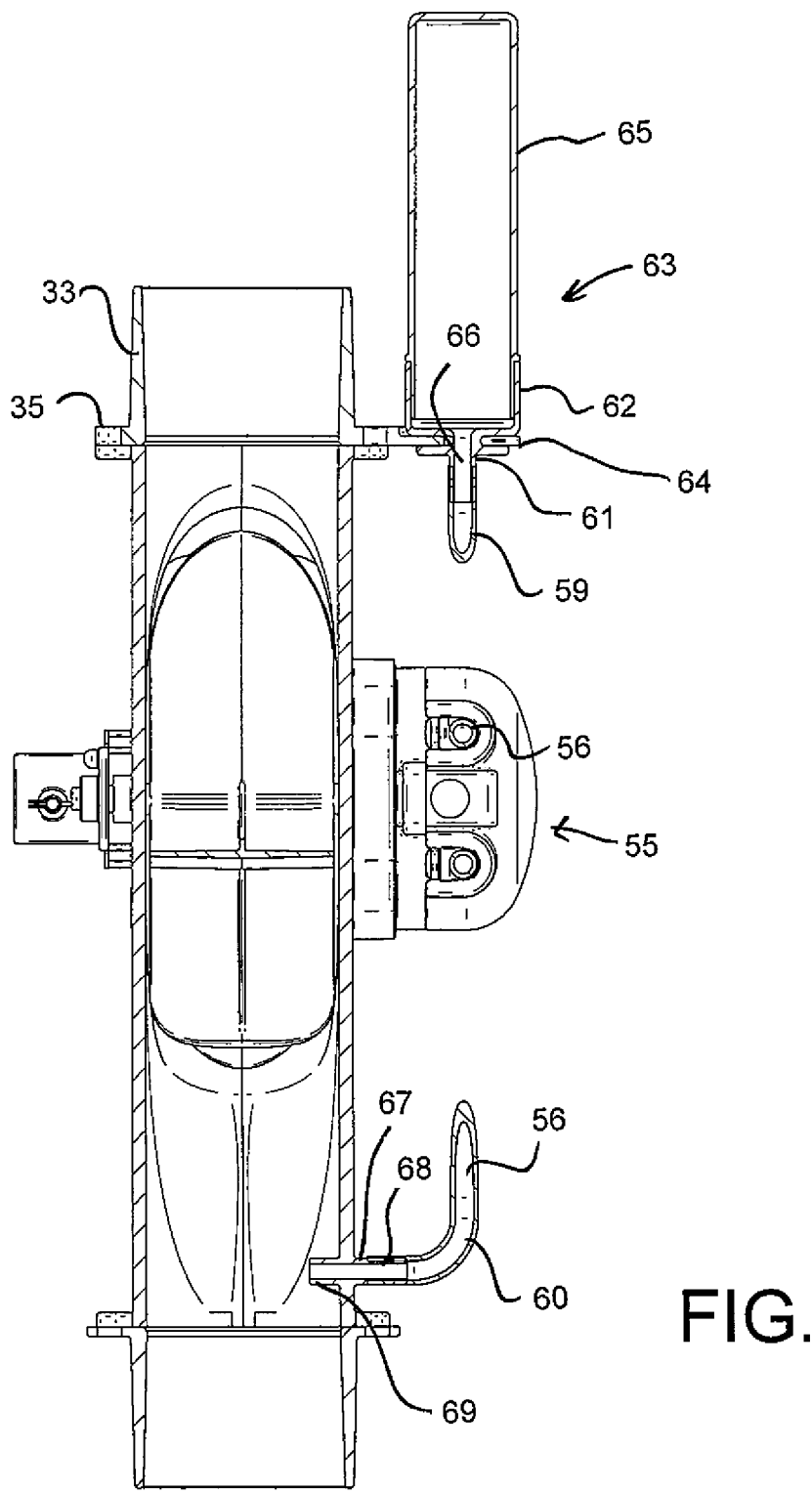
FIG. 8 is a cross-sectional view along the lines 8-8 of the additive metering system of FIG. 2.
Figure 9:
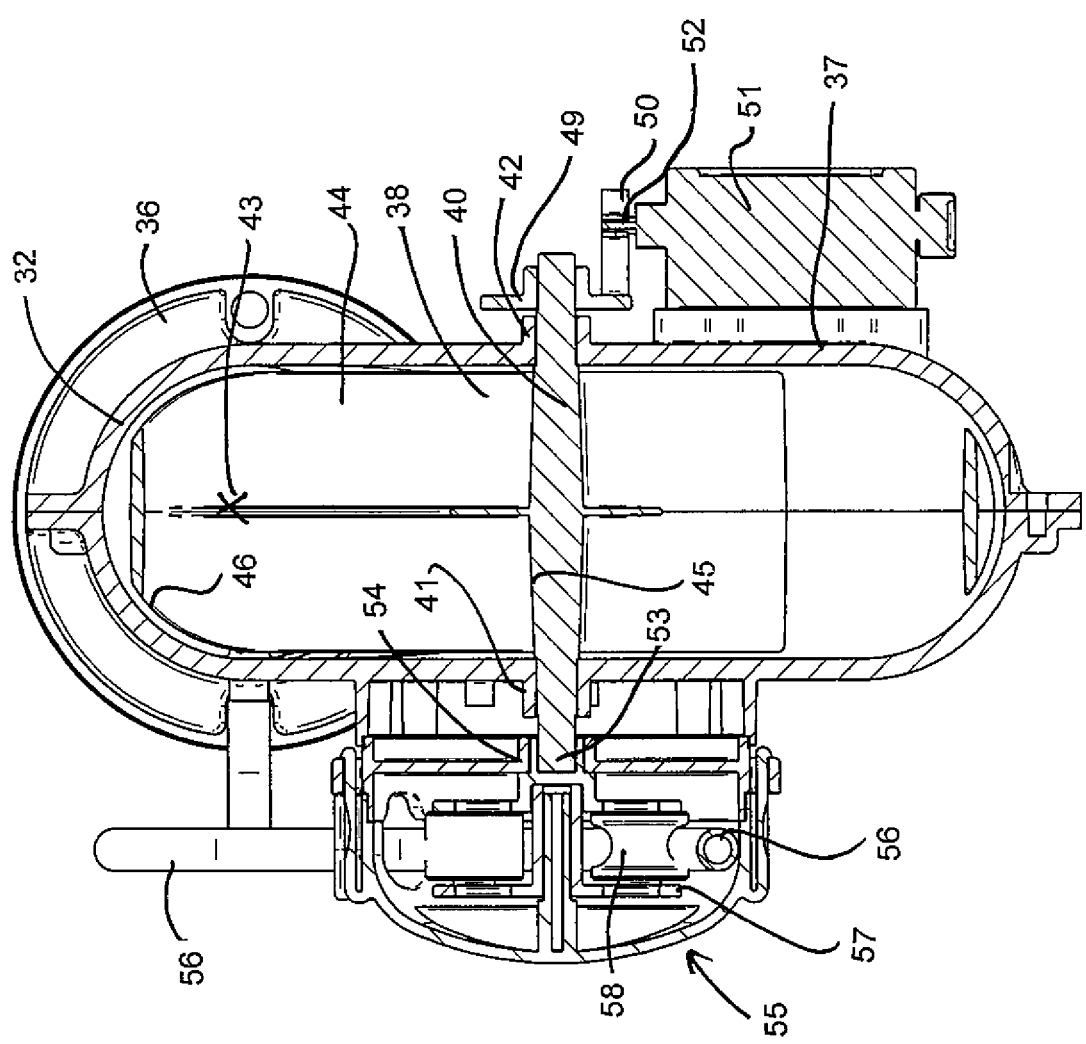
FIG. 9 is a cross-sectional view along the lines 9-9 of the additive metering system of FIG. 2.
Figure 11:
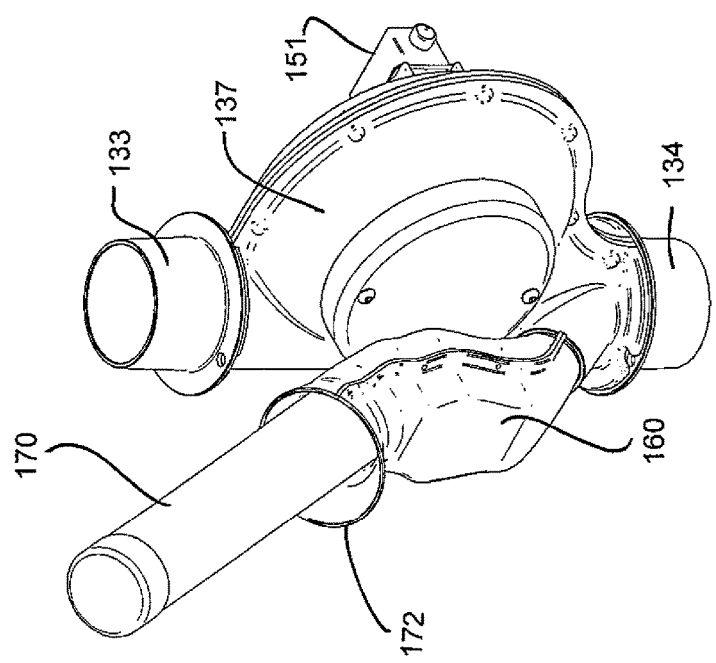
FIG. 11 is a second isometric view of the additive metering system of FIG. 10.
Figure 10:
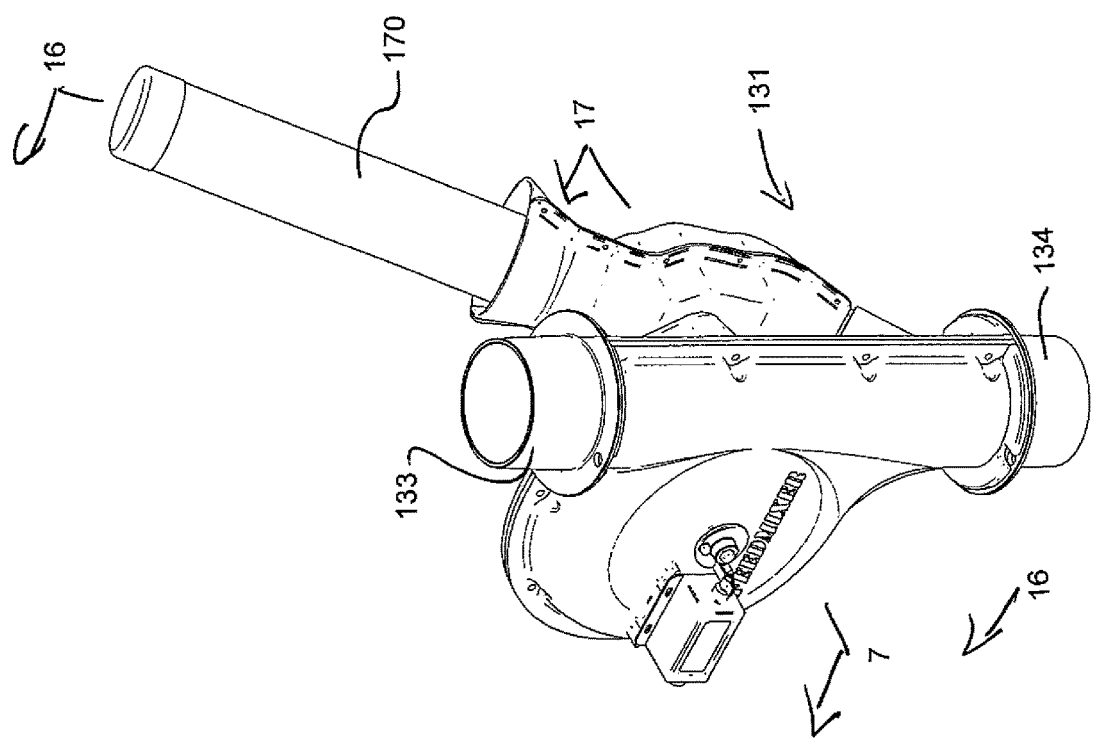
FIG. 10 is a first isometric view of a second embodiment of an additive metering system for use with the feeder of FIG. 1.
Figure 12:
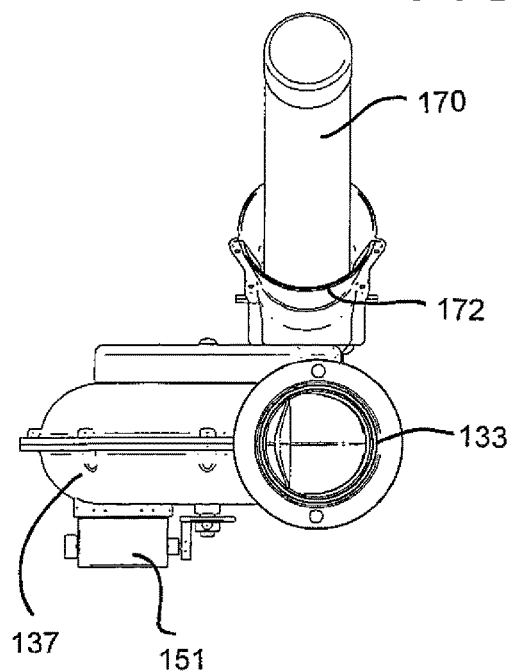
FIG. 12 is a top plan view of the additive metering system of FIG. 10.
Figure 13:
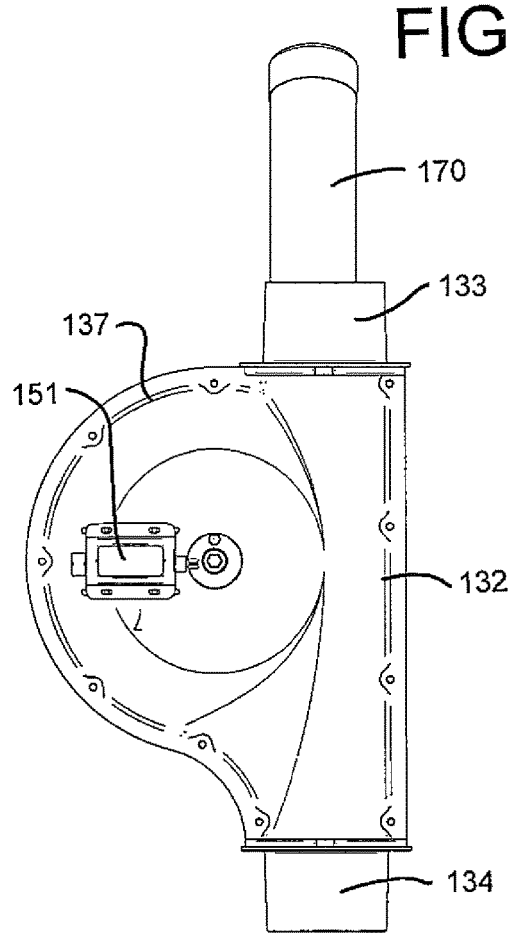
FIG. 13 is a side elevational view of the additive metering system of FIG. 10.
Figure 14:
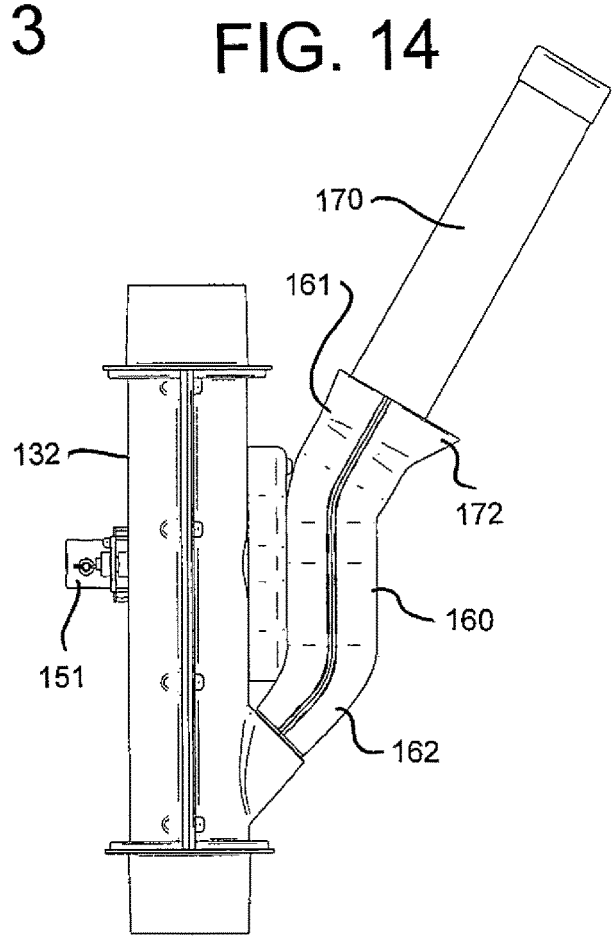
FIG. 14 is a front elevational view of the additive metering system of FIG. 10.
Figure 15:
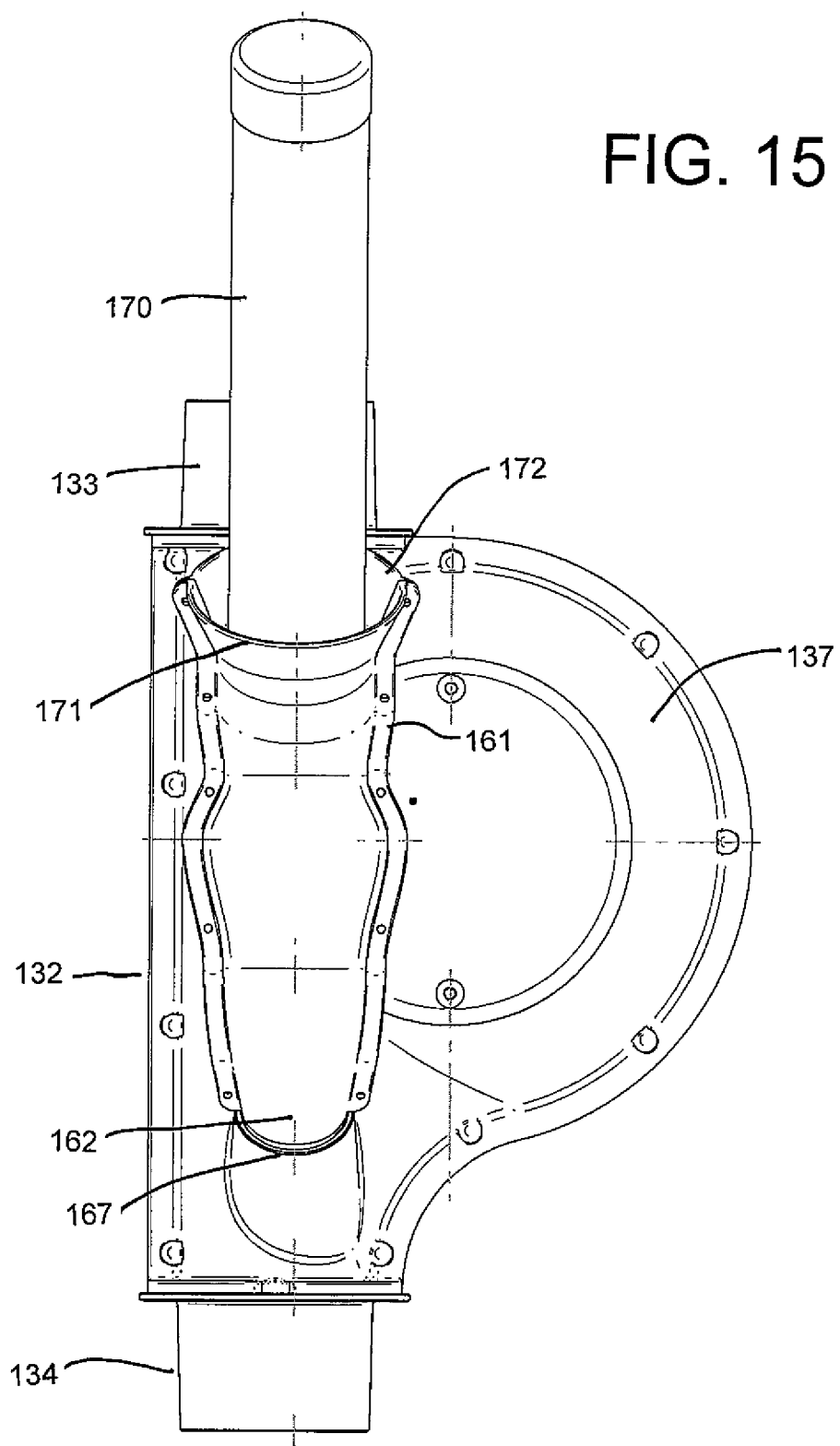
FIG. 15 is an opposed side elevational view of the additive metering system of FIG. 10.

As shown in FIGS. 7, 8 and 9, the paddle wheel 38 includes blades 44 which are arranged to extend across the duct from an inner edge 45 at the axle to an outer edge 46 of the blade which is located at the inside surface of the duct 32 as best shown in FIG. 9. The blade 44 as viewed inside elevational view are curved outwardly and rearwardly to a tip portion 46 located adjacent the inside surface of the duct 32. Assume the best in FIG. 9, the curvature of the blade is such that the outside edge 46 closely follows the inside surface of the duct 32. As the tip 48 of the outer edge 46 is curved rearwardly, it extends outwardly beyond a semicircle at the outer edge 46. That is, if the blade were directly radial, the outer edge would be semicircular. However because the blade is curved rearwardly tip 48 is more pointed so that the tip lies on a circle surrounding the axle 40 where the distance of the tip 48 from the axle is equal to the distance of the inside surface of the duct 32 from the axle 40.

In this way the feed material falling on the gravity through the duct 32 drops on to a respective one of the blades 44 which is placed across the duct so that the feed is prevented from passing through the duct without engaging the respective blade and rotating that blade in the forward direction opposite to the rearward curvature of the blade. In this way the blades act so that the rotation of the axle 40 is proportional to the amount of feed passing the wheel through the duct 32.

As best shown in FIG. 9, the axle 40 carries at one end a sprocket 49 which drives a wheel 50 of a counter 51. The sprocket 49 rotates around the axis of the axle 40 and the wheel 50 is arranged at right angles to the axle so as to drive a shaft 52 which provides an input into the counter 51. The counter 51 has a display 53 so as to indicate to a user a number indicative of the rotation of the wheel and so as to indicate to the user a situation where the wheel is for some reason not rotating due to a blockage or breakage.

At the other end of the axle 40 is provided a splined drive member 53 which provides a drive to and input gear 54 causing rotation of a peristaltic pump 55. The peristaltic pump is of a conventional construction including a tube 56 which wraps around a wheel 57 on which the rollers 58 roll so as to squeeze the tube around the wheel 57 to force liquid forwardly in the tube from a feed end 59 of the tube to a discharge end 60 of the tube. The peristaltic pump 55 therefore acts to pump forwardly a positive volume of liquid which is directly proportional to the rotation of the axle 40. The direct connection therefore between the axle 40 and the peristaltic pump ensures that the rate of pumping of the liquid is directly proportional to the rate of rotation of the wheel and therefore to the rate of movement of the feed.

The counter 51 is located on one side of the enclosure 37 and the peristaltic pump 55 is mounted on the opposite side of the enclosure 37 at opposite ends of the axle 40.

As shown in FIG. 3, the feed end of 59 of the tube is connected to a nipple 61 of a receptacle 62 for injection of the liquid from a supply generally indicated at 63. The receptacle 62 forms a cylindrical receiver portion two which is connected to nipple 61 projecting downwardly through a bracket 64 attached to the flange 35. The bracket 64 bus projects outwardly to one side of the duct to a position generally aligned with the pump 55. The cylindrical receiver portion of the receptacle 62 is arranged to receive the bottom end of a cylindrical container 65 forming the supply 63. Thus the container 65 comprises a simple cylindrical body with a nozzle 66 at the lower end. In this way the supply is provided as a readily portable cartridge member which can be carried to the device and inserted into place at the bracket 64 by placing the lower end of the cartridge into the receptacle 62 with the nozzle 66 projecting into the nipple 61 to be retained in place. This insertion can generally occur without the escape of liquid until the pumping action occurs which extracts the liquid from the cartridge 65 and feed it through the tube 56 to the lower feed end 60 of the tube.

The lower feed end is attached to an injection port 67 mounted on the housing 31 at the side of the duct 32. The injection port 67 includes a sleeve and 68 onto which the tube 56 is attached and a projecting end 69 which projects slightly into the duct so as to direct the liquid away from the wall of the duct and into the feed material within the duct. In this way the liquid supply is formed as an integral part of the device with the supply being carried on the housing and the injection nozzle 69 forming part of the housing.

Turning to the arrangement shown in FIGS. 10 to 17, a construction is provided which allows the supply of a particulate material in replacement for the liquid of the embodiment previously described. The construction of some includes a housing 131 including the top and bottom sleeves 133 and 134 together with the enclosure 137 and the wheel 138. As previously described the wheel 138 includes an axle 140 which provides drive to the counter 151 and to a pump mechanism. In this embodiment the pump 55 is replaced by a particulate feed mechanism 155.

Figure 16:
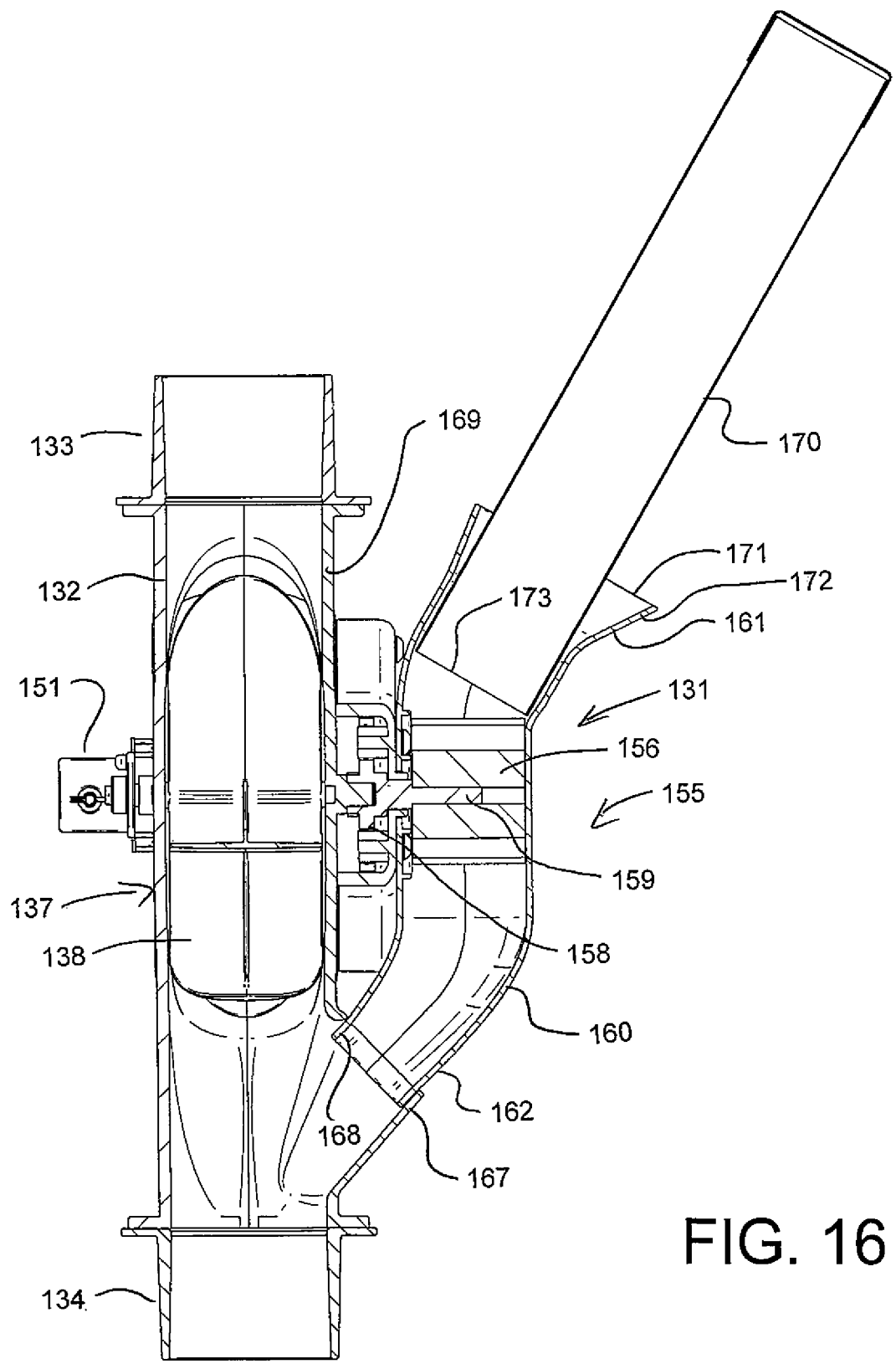
FIG. 16 is a cross-sectional view along the lines 16-16 of the additive metering system of FIG. 10.
Figure 17:
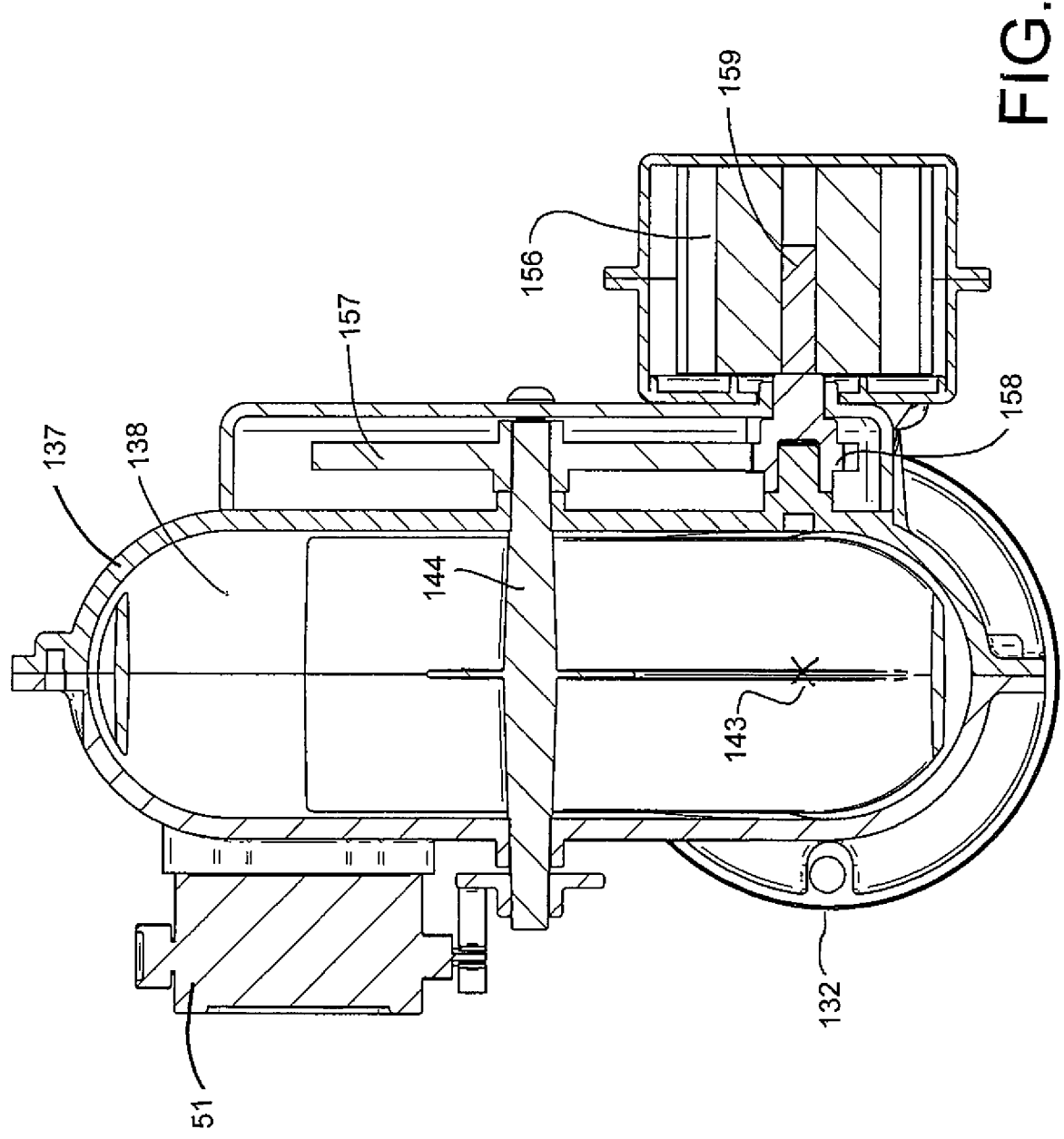
FIG. 17 is a cross-sectional view along the lines 17-17 of the additive metering system of FIG. 10.
Figure 18:
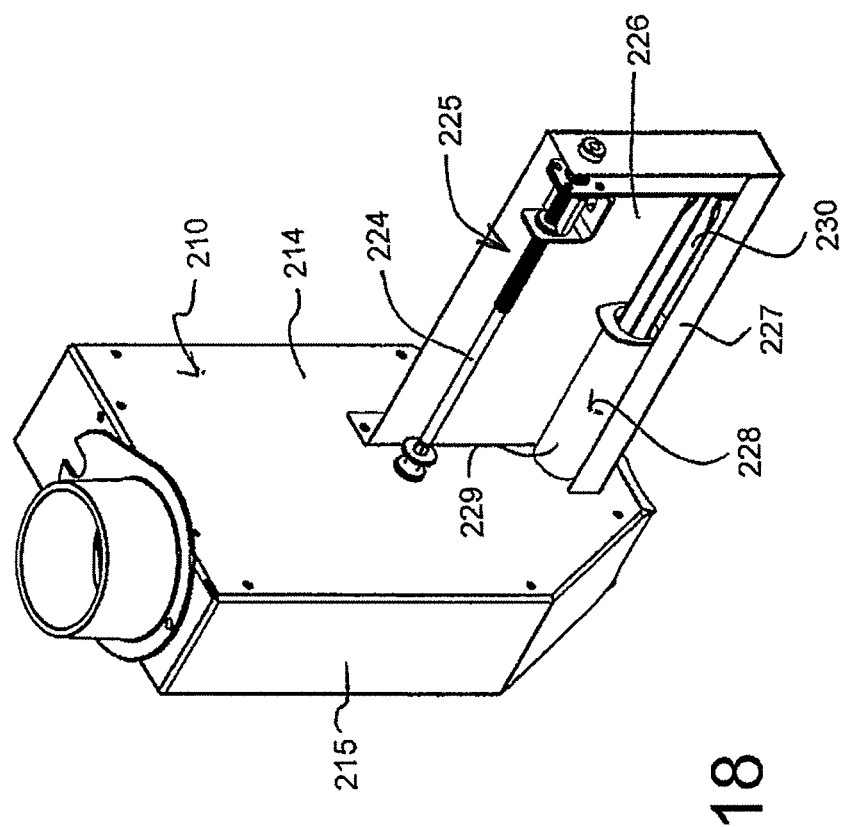
FIG. 18 is an isometric view of a further alternative embodiment according to the invention which uses a conventional syringe which is compressed longitudinally to inject a liquid additive in to the housing.

As best shown in FIG. 16, the particulate feed mechanism 155 includes a wheel 156 driven from the axle 144 of the wheel 138. At the end of the axle 144 is a drive gear 157 rotating about the axis of the axle 144 and acting to drive a sprocket 158 mounted on an axle 159 of the wheel 156. As shown in FIG. 17 the diameter of the wheel 157 is such that the axle 159 is aligned substantially with the axis 143 of the duct 132. The wheel 156 is mounted in a channel 160 extending from a feed end 1612 a discharge end 162. In this embodiment the duct 132 has the inlet 167 arranged to receive a particulate material rather than liquid as in the previous embodiment. Both the inlet 167 is of a width approximately equal to the width of the channel and is inclined downwardly and inwardly into the duct 132. The inlet 167 provides a mouth receiving a cylindrical end portion 168 of the channel 160 so that the particulate material in the channel can flow smoothly from the channel into the duct 132 where the additive particulate material mixes with the feed in the duct.

The channel 160 is located at a spaced position from a side wall 169 of the enclosure 137 so that the mechanism for driving the wheel 156 is positioned between the channel and the enclosure and so that the feed end 161 is presented in a readily available manner to the user for insertion of a cartridge 170. The feed end 161 is flared to form a wider open mouth 171 with a lower lip 172 over which a bottom edge 173 of the cartridge can be inserted. Thus an open cartridge containing the particulate material can be inserted by a user simply by moving the mouth of the cartridge toward the flared mouth of the opening and placed over the lip 172 to insert the cartridge and invert the cartridge so that it stands upwardly from the feed end 161 to discharge the particular material into the channel.

As previously described in respect of the liquid supply pump, the paddlewheel 138 is arranged to drive the feed wheel 156 at a rotation rate proportional to the rate of feed material passing through the duct 132 thus metering the particulate material from the cartridge 170 into the channel 160 and through the opening 167 into the duct 132. The rate of addition of the particulate material is therefore directly proportional to the rate of passage of the feed material.

As previously described, the components driven by the wheel 138 include the counter 151 together with the metering system for the additive material. In some embodiments, the wheel 138 can be used simply to drive a counter. In other embodiments the counter can be omitted and the wheel can be used simply to drive the metering system for the additive material.

In order to halt the supply of the additive material, the user can simply remove the cartridge from its position by pulling it from the open mouth and returning the cartridge to its upright position for subsequent use of the remaining material. In this way the user can readily control the supply of the additive material for a specified period or for selected ones of the feeders.

The construction is readily mounted within existing feed ducts simply by attaching the housing between two duct components. The device is driven and operated solely by the movement of the feed material and requires no power supply nor any control components.

In FIGS. 18 through 22 is shown a further embodiment of the invention where a housing 210 is provided for connection into a feed duct which includes a top collar 211 onto which the duct can be attached. A bottom end 212 of the housing is arranged to discharge feed material either directly into a feed dispenser for animals or into a further duct portion for transmission of the feed.

The housing 210 includes a front wall 213, a rear wall 214 and two sidewalls 215 and 216 thus forming a rectangular upper portion. Lower walls 217 and 218 converts downwardly to the lower dispensing opening 212. It will be understood that the shape of the housing can be modified on the construction formed from a moulded plastics material rather than the panels illustrated in the figures. Within the housing is mounted a paddlewheel 220 of a construction similar to the previously disclosed which includes a central hub 221 and the curved paddle wheels 222. A guide surface 223 directs material entering the collar 211 onto the left hand side of the paddlewheel so that the material is collected within the cup-shaped receptacles defined by the curved blades 222 thus causing the paddlewheel to rotate in a counterclockwise direction around a central mounting shaft 224.

A receptacle 225 is provided on the rear wall 214 and provides a rearwardly extending support wall 226 and a bottom channel 227 into which a syringe 228 can be inserted. The syringe includes a cylindrical body 229 and a plunger 230 with an end face 241 for squeezing the plunger into the body 229. The front face of the syringe includes an injection nozzle 231 of a conventional nature which is arranged to be presented through a hole 232 in the rear wall 214.

The shaft 224 passes through the front and rear walls of the housing where it is supported on suitable bearing members and extends from the housing rearwardly along a shaft portion 234. The shaft portion extends along one side of the rearwardly extending support wall 225 and is carried on its rearward end in a bearing 235 mounted on a plate 236 at right angles to the supporting plate 225. The shaft portion 234 carries a screw 237 which drives a drive member 238 linearly along the shaft portion 234 in a direction toward the rear face 214. The drive member 238 carries a depending plate 239 which abuts against the end plate 239 of the syringe. In this way screw 237 drives the plate 239 forwardly toward the housing after rate which is directly proportional to the rate of rotation of the paddlewheel within the housing which is in turn directly proportional to the rate of passage of the feed material through the housing from the collar 211 to the discharge 212.

The use of a syringe as the container for the liquid material to be dispensed into the feed material is particularly effective since such syringes are readily available and can be commercially purchased containing the suitable additives to be applied to the feed material. The mechanical advantage provided by the screw allows the syringe to be compressed using simply the weight of the feed material on the paddles 222. The liquid is thus dispensed accurately in proportion to the feed material passing through the housing and is easily incorporated into that material as it passes the injection nozzle 231.

The invention claimed is:

1. An apparatus for feeding animals comprising:
    a feed dispensing system;
    a plurality of feed dispensing containers at each of which at least one animal can take feed material;
    each feed dispensing container comprising:
        a feed supply duct through which feed passes;
        a rotatable paddlewheel member mounted at the duct and arranged to be driven in rotation around an axis in response to feed passing at a rate proportional to the passing of the feed;
        a container for a liquid additive material for supply to an injection opening for addition to the feed passing through the duct;
        and a compression member driven by the rotation of the rotatable paddlewheel member arranged to apply a pressure to the liquid additive material in the container to expel the liquid additive material to the injection opening.

2. The apparatus according to claim 1 wherein the container sits in a receptacle and the compression member is actuated to apply said pressure to the container in the receptacle longitudinally of the receptacle to expel the liquid additive material therefrom.

3. The apparatus according to claim 2 wherein the receptacle forms a tray in which the container lies.

4. The apparatus according to claim 1 wherein the compression member is movable in a direction longitudinally of the container.

5. The apparatus according to claim 4 wherein compression member comprises a plunger movable longitudinally into the container.

6. The apparatus according to claim 1 wherein the compression member is driven linearly by rotation of the rotatable paddlewheel member.

7. The apparatus according to claim 6 wherein the compression member is driven by a screw.

8. The apparatus according to claim 1 wherein the compression member acts to reduce the volume of the container.

9. The apparatus according to claim 1 wherein the container has a supply opening at the duct and the compression member compresses the liquid additive material toward said one end.

10. The apparatus according to claim 9 wherein the supply opening comprises an injection nozzle at said one end.

11. The apparatus according to claim 1 wherein there is provided a housing within which the rotatable paddlewheel member is mounted and wherein the housing forms said feed supply duct with couplings at top and bottom of the housing to connect to supply duct portions in a supply line of the feed dispensing system from a source of the feed to the respective dispensing container.

12. The apparatus according to claim 1 wherein the paddlewheel member comprises a plurality of paddle blades where each of the paddle blades extends across the duct from an inner edge on one side of the duct to an outer edge at the duct where the outer edge has an outer peripheral shape in a view longitudinal of the duct which closely matches an inside surface of the duct and where each of the paddle blades has a shape is side elevational view at right angles to the duct which is curved outwardly of an axis of the wheel and in a rearward direction relative to movement of the feed through the duct.

13. The apparatus according to claim 1 wherein the container comprises a syringe.

14. The apparatus according to claim 13 wherein a plunger of the syringe is driven longitudinally of the syringe by an abutment member moved longitudinally of the syringe by rotation of the rotatable paddlewheel member.

15. The apparatus according to claim 13 wherein the syringe is supported in a channel member.

* * * * *